United States Patent
Clapper et al.

(10) Patent No.: US 11,499,081 B2
(45) Date of Patent: Nov. 15, 2022

(54) STABILIZED WATER-DISPERSIBLE LATEX ADDITIVES FOR DRILLING FLUIDS

(71) Applicant: Baker Hughes Oilfield Operations LLC, Houston, TX (US)

(72) Inventors: Dennis K. Clapper, Houston, TX (US); Justin Thomas Porter, Sugar Land, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 0 days.

(21) Appl. No.: 17/361,049

(22) Filed: Jun. 28, 2021

(65) Prior Publication Data

US 2022/0041915 A1    Feb. 10, 2022

Related U.S. Application Data

(60) Provisional application No. 63/061,080, filed on Aug. 4, 2020.

(51) Int. Cl.
*C09K 8/12*    (2006.01)

(52) U.S. Cl.
CPC ..................... *C09K 8/12* (2013.01)

(58) Field of Classification Search
CPC .............. C09K 8/04; C09K 8/12; C09K 8/06
See application file for complete search history.

(56) References Cited

U.S. PATENT DOCUMENTS

| | | | |
|---|---|---|---|
| 3,132,693 | A | 5/1964 | Weisend |
| 4,045,357 | A | 8/1977 | Reed |
| 4,498,994 | A | 2/1985 | Heilweil |
| 4,792,412 | A | 12/1988 | Heilweil |
| 5,705,553 | A | 1/1998 | Kuropka |
| 7,905,287 | B2 | 3/2011 | Oyler et al. |
| 9,611,416 | B2 | 4/2017 | Wang et al. |
| 9,695,298 | B2 | 7/2017 | Sakata et al. |
| 9,969,921 | B2 | 5/2018 | Wang et al. |
| 10,017,680 | B2 | 7/2018 | Zhou et al. |
| 2004/0110644 | A1* | 6/2004 | Halliday ........... C09K 8/24 507/100 |
| 2004/0204323 | A1* | 10/2004 | Temple ............ C02F 5/12 507/100 |
| 2007/0015668 | A1 | 1/2007 | Harrower et al. |
| 2012/0015852 | A1 | 1/2012 | Quintero et al. |
| 2014/0275307 | A1 | 9/2014 | Dombrowski et al. |
| 2015/0191640 | A1 | 7/2015 | Lee et al. |
| 2016/0215196 | A1 | 7/2016 | Wang et al. |

FOREIGN PATENT DOCUMENTS

| | | |
|---|---|---|
| CN | 110846002 A | 2/2020 |
| JP | 2002538199 A | 11/2002 |
| WO | 1996003474 | 2/1996 |
| WO | 2005014972 A1 | 2/2005 |
| WO | 2005061609 A1 | 7/2005 |
| WO | 2008059037 A1 | 5/2008 |
| WO | 2015061342 A1 | 4/2015 |

OTHER PUBLICATIONS

Document (https://en.wikipedia.org/wiki/Potassium_chloride downloaded on Jan. 11, 2022).*
Lee, Jong-Min, et al.; "Effects of PVP on the formation of silverpolystyrene heterogeneous nanocomposite particles in novel preparation route involving polyol process: Molecular weight and concentration of PVP", Materials Chemistry and Physics, 114:2-3, 549-555, Apr. 2009.
Zou, Hua, et al; "Adsorption of Silica Nanoparticles onto Poly(N-vinylpyrrolidone)-Functionalized Polystyrene Latex", Langmuir, 33:6, 1471-1477, Feb. 2017.
Sequaris, JM, et al., "Polyvinylpyrrolidone adsorption on Namontmorillonite. Effect of the polymer interfacial conformation on the Colloidal behavior and binding of chemicals", Journal of Colloid and Interface Science, 230:1, 73-83, Oct. 2000.
Smith, J. N., et al., "Adsorption of Polyvinylpyrrolidone onto Polystyrene Latices and the Effect on Colloid Stability", Langmuir 1996, 12, 3773-3778, Oct. 1995.

* cited by examiner

Primary Examiner — Kumar R Bhushan
(74) Attorney, Agent, or Firm — Crowe & Dunlevy, P.C.

(57) ABSTRACT

A stabilized water-dispersible latex additive useful in both freshwater-based and brine-based drilling fluids, may be formed by mixing an effective amount of a compound containing at least one pyrrolidone ring, such as, polyvinylpyrrolidone, a vinylpyrrolidone-vinyl acetate copolymer, poly(1-vinylpyrrolidone-co-2-dimethylaminoethyl methacrylate), a vinylpyrrolidone-acrylic acid copolymer, and combinations thereof, with the water-dispersible latex additive before or after the water-dispersible latex additive is introduced to the drilling fluid.

17 Claims, No Drawings

STABILIZED WATER-DISPERSIBLE LATEX ADDITIVES FOR DRILLING FLUIDS

CROSS-REFERENCE TO RELATED APPLICATION

This application claims the benefit of U.S. Provisional Patent Application No. 63/061,080 filed Aug. 4, 2020, incorporated herein by reference in its entirety.

TECHNICAL FIELD

The present invention relates to additives for stabilizing water-dispersible micro-particle lattice latex products that are often used in water-based drilling fluids for control of fluid losses and pore pressure transmission, and more particularly relates to introducing an additive to these latex products to improve stability of the latex in a saltwater drilling environment.

BACKGROUND

In the drilling of subterranean oil and gas wells, a variety of functions and characteristics are expected of drilling fluids, also known as drilling muds, or simply "muds". The drilling fluid is expected to carry cuttings up from beneath the bit, transport them up the annulus, and allow their separation at the surface while at the same time the rotary bit is cooled and cleaned. A drilling fluid is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. It will be appreciated that within the scope of the specification herein, the term "drilling fluid" also encompasses "drill-in fluids".

Drilling fluids are typically classified into two categories: a water-based mud and an oil-based mud. In water-based muds, solid particles are suspended in water or brine, where the water or brine is the continuous phase. Oil can be emulsified in the water or brine. Oil-based muds are the opposite. Solid particles are suspended in oil, and water or brine is emulsified in the oil and therefore the oil is the continuous phase. Oil-based muds that are water-in-oil emulsions are also called invert emulsions.

Although oil-based muds perform well with regard to shale inhibition, borehole stability, and lubricity, because of the high costs and environmental concerns associated with the use of these invert emulsion drilling fluids, there has been an increasing industry need for high performance water-based drilling fluids.

A particular problem when drilling into shale formations with water-based fluids, however, is the pore pressure increase and swelling from penetration of the shale by the fluid. Reducing drilling fluid pressure invasion into the wall of a borehole is one of the most important factors in maintaining wellbore stability. It is recognized that sufficient borehole pressure will stabilize shales to maintain the integrity of the borehole. When mud or liquid invades the shale, the pressure in the pores rises and the pressure differential between the mud column and the shale falls. With the drop in differential pressure, the shale is no longer supported and can easily break off and fall into the well bore. Likewise, the invasion of water into the shale matrix increases hydration or wetting of the partially dehydrated shale body causing it to soften and to lose its structural strength.

In order to inhibit fluid loss to the fractures and stabilize the wellbore, water-dispersible micro-particle lattice latex have been added to water-based drilling fluids. In selecting latex products for drilling fluid compatibility, it is important that the latex have a high tolerance to salt and be stable in salt environments. Many latex lattices maintain the correct particle size range in freshwater drilling fluids, but begin coagulating to larger particles in the presence of salts containing both monovalent and divalent cations. Currently, there are very few commercially available latex products that are able to maintain stability in the presence of salts. There have been attempts to improve salt tolerance by post-manufacturing addition of surfactants. Unfortunately, upon being introduced to a water-based drilling fluid, most surfactant-treated latex has been shown to cause a great deal of foaming.

Therefore, there is a need for developing a broader range of water-dispersible latex additives that maintain stability and avoid foaming during saltwater drilling operations. It should be appreciated that the 'stability' of the latex in the context of this specification is different from the 'stability' of the wellbore, and that these two kinds of stability should be kept distinct from each other.

SUMMARY

There is provided, in one non-limiting form, a method for stabilizing a water-dispersible latex additive in a water-based drilling fluid including mixing a compound containing at least one pyrrolidone ring with a water-dispersible latex additive in an amount effective to maintain stability of the latex additive in the water-based drilling fluid. The compound containing a pyrrolidine ring may be mixed into the water-dispersible latex drilling fluid additive before the additive is introduced into the water-based drilling fluid or may be mixed directly with the water-based drilling fluid before or after the water-dispersible latex drilling fluid additive is introduced to the water-based drilling fluid. In one non-restrictive embodiment, the compound containing at least one pyrrolidine ring is selected from a group consisting of polyvinylpyrrolidone, vinylpyrrolidone-vinyl acetate copolymer, poly(1-vinylpyrrolidone-co-2-dimethyl-aminoethyl methacrylate), vinylpyrrolidone-acrylic acid copolymer, and combinations thereof.

There is further provided in another non-limiting form, a stable drilling fluid formulation comprising: at least one water-dispersible latex drilling fluid additive, from about 0.5 wt. % to about 10 wt. % of a compound containing at least one pyrrolidone ring based on total amount of water-dispersible drilling fluid latex additive, and a water-based drilling fluid.

DETAILED DESCRIPTION

It has been discovered that a compound having at least one pyrrolidone ring may be applied to or mixed with water-dispersible micro-particle lattice latex products, the kinds that are typically added or introduced to water-based drilling fluids to control fluid losses and pore pressure transmission, in order to increase the stability of the latex suspensions in water-based drilling fluids, especially those containing salt. As defined herein, "micro-particle" means having an average particle size of between about 0.01 to about 1.0 microns.

The water-dispersible latex additives that are commonly injected into downhole and drilling fluids to help stabilize boreholes during drilling operations, include, but are not limited to, styrene-butadiene copolymers, carboxylated styrene-butadiene copolymers, sulfonated styrene-butadiene copolymers, carboxylated-sulfonated styrene-butadiene copolymers, and combinations thereof. It is appreciated that the sulfonated latexes have an added advantage in that they can often be used in the absence of a surfactant in freshwater drilling operations.

Other suitable water-dispersible polymer latex additives for drilling fluids include, but are not limited to, polymethyl methacrylate, polyethylene, polyvinylacetate copolymer, polyvinyl acetate/vinyl chloride/ethylene copolymer, polyvinyl acetate/ethylene copolymer, natural latex, polyisoprene, polydimethylsiloxane, and combinations thereof.

The amount of the latex additive introduced, added, or applied to the drilling mud may range from about 0.1 vol. % independently to about 10 vol. % independently, from about 1 vol. % independently to about 8 vol. % independently, or from about 2 vol. % independently to about 5 vol. % independently, based on the total amount of the drilling fluid. As used herein with respect to a range, "independently" means that any threshold given may be used together with any other threshold given to provide a suitable alternative range.

The latex additives may be useful in controlling fluid losses and reducing pore pressure transmissions in both freshwater-based and brine-based drilling muds (i.e. drilling fluids), although they tend to coagulate and, in turn, destabilize in salt environments. Thus in the context of the methods and compositions herein, the term "maintain stability" or "increase stability" with respect to a water-dispersible latex in a water-based drilling fluid is defined to mean inhibit or prevent coagulation of the latex particles. The salts commonly found in brine-based drilling fluids, include, without limitation, calcium chloride, sodium chloride, potassium chloride, magnesium chloride, calcium bromide, sodium bromide, potassium bromide, calcium nitrate, sodium formate, potassium formate, cesium formate, and combinations thereof. In some cases, a "high salt content" or "saturated" brine-based drilling fluid is to be used, which means, for purpose of this disclosure, that the latex additive is introduced to a brine-based drilling fluid in which salt is present in the brine-based drilling fluid in an amount that is 20 wt. % or greater, based on the total amount of water in the drilling fluid. It will appreciated that it is impossible to predict in advance what the salt content of a particular saturated brine solution will be since the saturation point depends on a number of factors including, but not limited to, the kinds and proportions of the various components of the water-based drilling fluid.

The water-dispersible latex drilling fluid additives of the kinds disclosed herein may be stabilized by the introduction of a compound containing at least one pyrrolidone ring. In a non-limiting embodiment, the compound containing a pyrrolidone ring may be polyvinylpyrrolidone. In another non-limiting embodiment, the compound containing a pyrrolidone ring may be a vinylpyrrolidone-vinyl acetate copolymer, poly(1-vinylpyrrolidone-co-2-dimethylaminoethyl methacrylate), and/or a vinylpyrrolidone-acrylic acid copolymer. In one non-limiting embodiment, it is not necessary that the compound be a polymer, and in a different non-limiting version, it is not necessary that the compound be a copolymer.

The water-dispersible latex drilling additives may be stabilized, in one non-restrictive embodiment, by introducing the compound containing at least one pyrrolidone ring to the water-dispersible latex drilling additive prior to the latex additive being used or applied to a water-based drilling fluid. In other words, the compound containing a pyrrolidone ring is applied or introduced to the water-dispersible latex drilling fluid additive to form a treated water-dispersible latex drilling fluid additive and then the treated water-dispersible latex drilling fluid additive is introduced to the water-based drilling fluid. Alternatively, the compound containing a pyrrolidone ring may be introduced to the water-based drilling fluid before or after the water-dispersible drilling fluid latex additive is added to the water-based drilling fluid and still be effective in stabilizing the water-dispersible drilling fluid additive during drilling operations.

In one non-limiting embodiment, the amount of the compound containing a pyrrolidone ring effective to stabilize the water-dispersible latex drilling fluid additive may range from about 0.5 wt. % independently to about 10 wt. % independently, or from about 1 wt. % independently to about 8 wt. % independently, or from about 2 wt. % independently to about 5 wt. % independently, based on total weight of water-dispersible drilling fluid latex additive.

In one non-limiting embodiment, the components of the water-based drilling fluids described herein include the water-dispersible polymer latex, the compound containing at least one pyrrolidone ring, and water, which makes up the bulk of the fluid. Of course, a number of other common drilling fluid additives may be employed as well to help balance the properties and tasks of the fluid.

In the foregoing specification, the invention has been described with reference to specific embodiments thereof. However, it will be evident that various modifications and changes can be made thereto without departing from the broader spirit or scope of the invention. Accordingly, the specification is to be regarded in an illustrative rather than a restrictive sense. For example, fluids, latex additives, compounds containing one or more pyrrolidone ring, formulations, methods for stabilizing, and amounts not specifically identified or described in this disclosure or not evaluated in a particular Example are still expected to be within the scope of this invention.

The present invention may suitably comprise, consist or consist essentially of the elements disclosed and may be practiced in the absence of an element not disclosed. For instance, the method or formulation may comprise, consist essentially of, or consist of the steps or components recited herein. More specifically, in the method for stabilizing a water-dispersible latex additive in a water-based drilling fluid, the method may consist essentially of or consist of mixing a compound comprising, consisting essentially of, or consisting of at least one pyrrolidone ring with a water-dispersible latex additive in an amount effective to maintain stability of the water-dispersible latex additive in the water-based drilling fluid.

Additionally, there may be provided a stable drilling fluid formulation, where the formulation consists essentially of or consists of a compound containing at least one pyrrolidone ring, at least one water-dispersible latex additive, and a water-based drilling fluid; where the compound containing at least one pyrrolidone ring is present in an amount ranging from about 0.5 wt. % to about 10 wt. %, based on total amount of the water-dispersible drilling fluid latex additive.

The words "comprising" and "comprises" as used throughout the specification, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for stabilizing a water-dispersible latex additive in a water-based drilling fluid, the method comprising:
    mixing a compound comprising polyvinylpyrrolidone with the water-dispersible latex additive selected from the group consisting of carboxylated styrene-butadiene copolymer, sulfonated styrene-butadiene copolymer, carboxylated-sulfonated styrene-butadiene copolymer, and combinations thereof, in a polyvinylpyrrolidone amount effective to maintain stability of the water-dispersible latex additive in the water-based drilling fluid; and
    inhibiting or preventing coagulation of the water-dispersible latex additive particles.

2. The method of claim 1, wherein the water-based drilling fluid is a brine-based drilling fluid.

3. The method of claim 2, wherein the brine-based drilling fluid comprises at least one salt selected from the group consisting of calcium chloride, sodium chloride, potassium chloride, magnesium chloride, calcium bromide, sodium bromide, potassium bromide, calcium nitrate, sodium formate, potassium formate, cesium formate, and combinations thereof.

4. The method of claim 3, wherein the salt is present in the brine-based drilling fluid in an amount that is 20 wt. % or greater, based on the total amount of the water in the brine-based drilling fluid.

5. The method of claim 1, comprising:
    introducing the compound comprising polyvinylpyrrolidone into the water-dispersible latex additive forming a treated water-dispersible latex additive; and then
    introducing the treated water-dispersible latex additive into the water-based drilling fluid.

6. The method of claim 1 comprising introducing the compound comprising polyvinylpyrrolidone into the water-based drilling fluid before or after the water-dispersible drilling fluid latex additive is added to the water-based drilling fluid.

7. The method of claim 1, wherein the effective amount of the compound comprising polyvinylpyrrolidone ranges from about 0.5 wt. % to about 10 wt. %, based on total weight of the water-dispersible drilling fluid latex additive.

8. A method for stabilizing a water-dispersible latex additive in a brine-based drilling fluid, the method comprising:
    mixing a polyvinylpyrrolidone with the water-dispersible latex additive selected from the group consisting of carboxylated styrene-butadiene copolymer, sulfonated styrene-butadiene copolymer, carboxylated-sulfonated styrene-butadiene copolymer, and combinations thereof, in a polyvinylpyrrolidone amount effective to maintain stability of the water-dispersible latex additive in the brine-based drilling fluid; and
    inhibiting or preventing coagulation of the water-dispersible latex additive particles;
wherein the effective amount of the polyvinylpyrrolidone ranges from about 0.5 wt. % to about 10 wt. %, based on total weight of the water-dispersible drilling fluid latex additive.

9. The method of claim 8, wherein the brine-based drilling fluid comprises at least one salt selected from the group consisting of calcium chloride, sodium chloride, potassium chloride, magnesium chloride, calcium bromide, sodium bromide, potassium bromide, calcium nitrate, sodium formate, potassium formate, cesium formate, and combinations thereof.

10. The method of claim 8, wherein the salt is present in the brine-based drilling fluid in an amount that is 20 wt. % or greater, based on the total amount of the water in the brine-based drilling fluid.

11. The method of claim 8, comprising:
    introducing the polyvinylpyrrolidone into the water-dispersible latex additive forming a treated water-dispersible latex additive; and then
    introducing the treated water-dispersible latex additive into the brine-based drilling fluid.

12. The method of claim 8 comprising introducing the polyvinylpyrrolidone into the brine-based drilling fluid before or after the water-dispersible drilling fluid latex additive is added to the brine-based drilling fluid.

13. A method for stabilizing a water-dispersible latex additive in a brine-based drilling fluid, the method comprising:
    mixing a compound comprising polyvinylpyrrolidone with the water-dispersible latex additive selected from the group consisting of carboxylated styrene-butadiene copolymer, sulfonated styrene-butadiene copolymer, carboxylated-sulfonated styrene-butadiene copolymer, and combinations thereof, in a polyvinylpyrrolidone amount effective to maintain stability of the water-dispersible latex additive in the brine-based drilling fluid; and
    inhibiting or preventing coagulation of the water-dispersible latex additive particles;
wherein the brine-based drilling fluid comprises at least one salt selected from the group consisting of calcium chloride, sodium chloride, potassium chloride, magnesium chloride, calcium bromide, sodium bromide, potassium bromide, calcium nitrate, sodium formate, potassium formate, cesium formate, and combinations thereof.

14. The method of claim 13, wherein the salt is present in the brine-based drilling fluid in an amount that is 20 wt. % or greater, based on the total amount of the water in the brine-based drilling fluid.

15. The method of claim 13, comprising:
    introducing the compound comprising polyvinylpyrrolidone into the water-dispersible latex additive forming a treated water-dispersible latex additive; and then
    introducing the treated water-dispersible latex additive into the brine-based drilling fluid.

16. The method of claim 13 comprising introducing the compound comprising polyvinylpyrrolidone into the brine-based drilling fluid before or after the water-dispersible drilling fluid latex additive is added to the brine-based drilling fluid.

17. The method of claim 13, wherein the effective amount of the compound comprising polyvinylpyrrolidone ranges from about 0.5 wt. % to about 10 wt. %, based on total weight of the water-dispersible drilling fluid latex additive.

* * * * *